(12) United States Patent
Srinivasan et al.

(10) Patent No.: US 8,024,696 B1
(45) Date of Patent: Sep. 20, 2011

(54) CLOCK SPEED FOR A DIGITAL CIRCUIT

(75) Inventors: Sankaranarayanan Srinivasan, San Jose, CA (US); Dinesh D. Gaitonde, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 512 days.

(21) Appl. No.: 12/270,112

(22) Filed: Nov. 13, 2008

(51) Int. Cl.
*G06F 9/455* (2006.01)
*G06F 17/50* (2006.01)

(52) U.S. Cl. ................ 716/134; 716/108; 716/113

(58) Field of Classification Search .......... 716/108, 716/113, 134
See application file for complete search history.

(56) References Cited

U.S. PATENT DOCUMENTS

| 7,711,513 | B2 * | 5/2010 | Sotiriou | 702/118 |
| 2004/0216064 | A1 * | 10/2004 | Gass | 716/7 |
| 2005/0131670 | A1 * | 6/2005 | Wang et al. | 703/23 |
| 2009/0271747 | A1 * | 10/2009 | Tanaka | 716/2 |

OTHER PUBLICATIONS

Yoshikawa et al.; "Timing Optimization by Replacing Flip-Flops to Latches"; 2004; IEEE; pp. 186-191.*
Xilinx, Inc., U.S. Appl. No. 12/128,335 by Srinivasan et al.; filed May 28, 2008.
Albrecht, C. et al.; "Cycle Time and Slack Optimization for VLSI-Chips"; Computer-Aided Design; 1999; Digest of Technical Papers; 1999 IEEE/ACM International Conference on Volume; pp. 232-238.
Burks, T. et al.; "Critical Paths in Circuits with Level-Sensitive Latches"; IEEE Transactions on Very Large Scale Integration (VLSI) Systems; vol. 3, No. 2; Jun. 1995; pp. 273-291.

* cited by examiner

*Primary Examiner* — Suresh Memula
(74) *Attorney, Agent, or Firm* — LeRoy D. Maunu

(57) ABSTRACT

Various approaches for improving clock speed for a circuit design. In one embodiment, a graph having nodes and edges that represent the circuit design is generated. The nodes represent flip-flops of the design, the edges represent couplings of data inputs and outputs of the flip-flops, and the edges have associated delay values for respective durations of signal delays of the couplings. A smallest period is determined for which subtracting each delay value from the smallest period and associating the difference with the associated edge does not create a negative cycle in the graph. A path in the graph is selected, the path including selected flip-flops and connecting edges. The circuit design is modified by replacing the selected flip-flops with latches, and the smallest period is output.

20 Claims, 6 Drawing Sheets

CLOCK SPEED FOR A DIGITAL CIRCUIT

FIELD OF THE INVENTION

The present invention generally relates to approaches for improving the clock speed at which a digital circuit can operate.

BACKGROUND

Many factors or constraints are considered in preparing a circuit design. Examples include cost, power consumption, circuit area, and clock speed. Often, improving one characteristic of the design will have a corresponding negative impact on another characteristic of the design. Thus, during the design process various compromises are made between competing design constraints. However, once a circuit design has been successfully placed and routed, the resulting placed-and-routed design is expected to satisfy the various design factors.

In some instances, a placed-and-routed circuit may not satisfy all the design constraints. For example, one or more critical paths of the circuit may not satisfy a timing constraint. In this case, the designer may either relax the timing constraint and operate the circuit at a slower clock speed, or analyze and modify the design to bring the critical paths into compliance with the timing constraint. Current computer aided design tools used in stages from the design capture stage to making the placed-and-routed design may provide limited or no support for further improving the design to achieve a greater clock rate after the design has been placed and routed.

The present invention may address one or more of the above issues.

SUMMARY

The various embodiments of the invention provide approaches for improving the clock speed for a circuit design. In one embodiment, a graph having nodes and edges that represent the circuit design is generated. The nodes represent flip-flops of the design, and the edges represent couplings of data inputs and outputs of the flip-flops. The edges have associated delay values representing respective durations of delay of the couplings. A smallest period is determined for which subtracting each delay value from the smallest period and associating the difference with the associated edge does not create a negative cycle in the graph. A path in the graph is selected, and the circuit design is modified by replacing those flip-flops that are represented by the nodes on the path with latches. The smallest period is output.

In another embodiment, an article of manufacture comprises a processor-readable storage medium configured with instructions for improving clock speed for a circuit design. The instructions, when executed by one or more processors, cause the one or more processors to perform the operations including generating a graph having nodes and edges that represent the circuit design. The nodes represent flip-flops of the design, the edges represent couplings of data inputs and outputs of the flip-flops, and the edges have associated delay values that represent respective durations of signal delays of the couplings. The operations further include determining a smallest period for which subtracting each delay value from the smallest period and associating the difference with the associated edge does not create a negative cycle in the graph. A path in the graph is selected, the selected path including selected flip-flops and connecting edges. The circuit design is modified by replacing the selected flip-flops with latches, and the smallest period is output.

A system for improving clock speed for a circuit design is provided in another embodiment. The system comprises a processor and a memory. The memory is configured with instructions that when executed by the processor cause the processor to perform the operations including generating a graph having nodes and edges that represent the circuit design. The nodes represent flip-flops of the design, the edges represent couplings of data inputs and outputs of the flip-flops, and the edges have associated delay values that represent respective durations of signal delays of the couplings. The operations further include determining a smallest period for which subtracting each delay value from the smallest period and associating the difference with the associated edge does not create a negative cycle in the graph. A path in the graph is selected, the selected path including selected flip-flops and connecting edges. The circuit design is modified by replacing the selected flip-flops with latches, and the smallest period is output.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

The various embodiments of the invention determine a clock signal frequency ("clock speed") for a circuit based on replacement of selected edge-triggered flip-flops of a design with transparent latches. An edge-triggered flip-flop is a circuit element for storing a bit of data, and the value applied at the data input of the flip-flop is not available until the next rising (or falling) edge of a clock/enable signal. A transparent latch is also a circuit element for storing a bit of data, but the value at the data input of the latch is propagated through to the output of the latch whenever the clock/enable signal is high (or low).

Since a transparent latch propagates its data input signal sooner than does an edge-triggered flip-flop, in some instances the clock speed for the circuit may be increased if selected edge-triggered flip-flops in the design are replaced with transparent latches. However, the increased clock speed must not be so great as to create the possibility for one latch in the logic cone from the output of another latch to miss a data input signal because of propagation delay between the latches.

In accordance with one embodiment of the invention, a placed-and-routed design having critical paths that satisfy the timing constraints may be improved by replacing selected edge-triggered flip-flops in the design with transparent latches and determining a suitable faster clock speed. Similarly, a placed-and-routed design having critical paths that do not satisfy the timing constraints may be fixed by replacing edge-triggered flip-flops in one or more critical paths of the design with transparent latches and determining a suitable faster clock speed.

While embodiments in which a placed-and-routed design is analyzed may provide significant benefits and introduce only minor perturbations to the design, other embodiments may analyze a design that has been placed but not routed. Still other embodiments may analyze a design during optimization of logic synthesis. It will be appreciated that in embodiments in which the design has not been both placed and routed, the available delay and timing information may be estimated and less accurate than for a fully placed-and-routed design.

The embodiments of the invention are especially useful for circuit designs targeted to field programmable gate arrays (FPGAs) and other programmable integrated circuits. In a number of FPGAs, for example, the VIRTEX® family of FPGAs from XILINX®, Inc., a flip-flop may be changed to a transparent latch by configuring the FPGA flip-flop to operate as a transparent latch. In an FPGA, since the same circuit element may be used to implement either an edge-triggered flip-flop or a transparent latch, the complex synthesis and verification procedures that are typically associated with making a similar replacement in an application specific integrated circuit (ASIC) design may be avoided.

Figure 1:
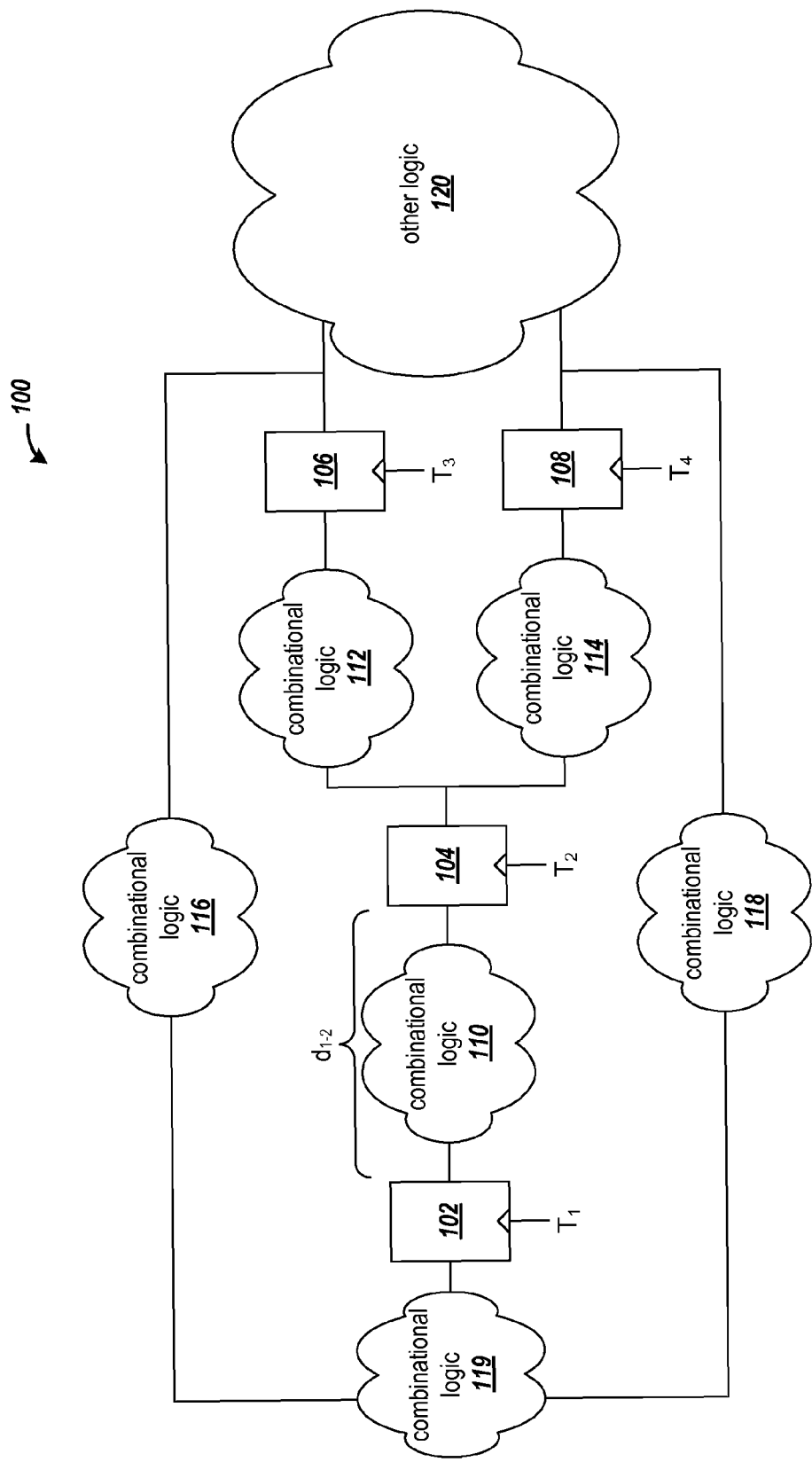
FIG. 1 illustrates part of an example flip-flop (FF) path in a circuit design.

FIG. 1 illustrates part of an example flip-flop path in a circuit design 100. The flip-flop path includes flip-flops (FFs) 102, 104, 106, and 108. The output of FF 102 is coupled to the data input of FF 104 via combinational logic 110, and the output of FF 104 is coupled to the data inputs of FFs 106 and 108 via combinational logic 112 and 114, respectively. The data outputs of FFs 106 and 108 are coupled to the data input of FF 102 via combinational logic 116 and 118, respectively, and combinational logic 119. The outputs of FFs 106 and 108 are also coupled to other logic 120 of the circuit design 100.

In determining a feasible clock speed, the propagation delays between the FFs and the required closing times of the FFs are considered for different clock periods. Each of combinational logic circuits 110, 112, 114, 116, 118, and 119 has a propagation delay that includes both block delays for elements in the logic and interconnect delays. The respective closing times of the FFs 102, 104, 106, and 108 are illustrated with the labels $T_1$, $T_2$, $T_3$, and $T_4$, on the clock/enable signal at each of the FFs. The propagation delay from FF 102, through logic 110, and to FF 104 is denoted and shown as $d_{1-2}$; the propagation delay from the output of FF 104, through logic 112, and to the input of FF 106 is denoted as $d_{2-3}$; the propagation delay from the output of FF 104, through logic 114, and to the input of FF 108 is denoted as $d_{2-4}$; the propagation delay from the output of FF 106, through logic 116, through logic 119 and to the input of FF 102 is denoted as $d_{3-1}$; and the propagation delay from the output of FF 108, through logic 118, through logic 119 and to the input of FF 102 is denoted as $d_{4-1}$.

In the exemplary embodiment, for each of the edge-triggered FFs that will possibly be converted to a transparent latch, if the latch is to be closed at time $T_i$, then the following conditions must hold for the clock period, P, and a propagation delay, $d_{i-j}$, from $T_i$ to $T_j$:

$$T_i \geq 0 \qquad \qquad \text{a)}$$

$$T_i \leq P/2; \text{ and} \qquad \qquad \text{b)}$$

$$T_i + d_{i-j} \leq T_j + P \qquad \qquad \text{c)}$$

Condition a) states that the closing time $T_i$ of latch$_i$ must be after the clock transition has occurred. Condition b) states that the amount of borrowing can only be less than half the period, P (assuming a 50% duty cycle). Condition c) is the standard clock period condition, which states that the closing time of latch$_i$ plus one clock period must be after the closing time of latch$_j$ plus the propagation delay from latch$_i$ to latch$_j$. Instead of solving the constraints for a clock speed using a linear programming approach, the embodiments of the current invention solve the problem using a directed graph approach.

Figure 2:
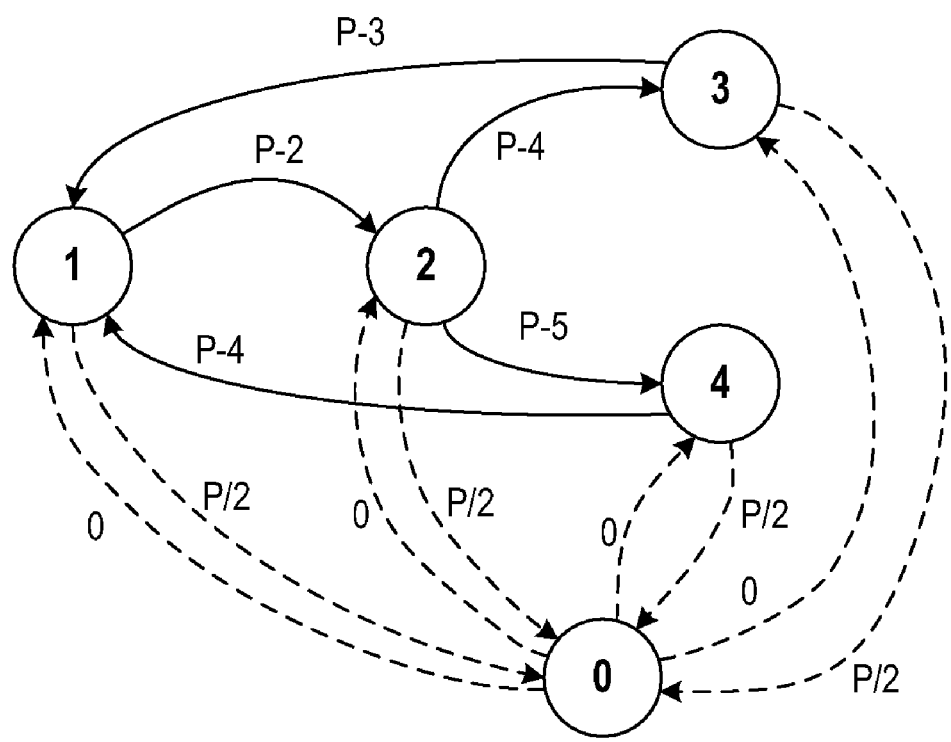
FIG. 2 shows an example directed graph generated from the FF path in FIG. 1.

FIG. 2 shows an example directed graph generated from the FF path 100 in FIG. 1. The nodes in the graph represent transparent latches, with the transparent latches corresponding to the converted edge-triggered FFs. The edges represent paths from outputs of the latches to data inputs, and the labels on the edges represent a rewriting of equation c): $P - d_{i-j} \geq T_j - T_i$, or $P - d_{i-j}$ for short. The edge values are slack values that are determined when evaluating different trial clock periods.

Node 1 represents a transparent latch for FF 102, node 2 represents a transparent latch for FF 104, node 3 represents a transparent latch for FF 106, and node 4 represents a transparent latch for FF 108. An arbitrary root node 0, or $T_0$, is introduced such that equation a) is rewritten as: $T_0 \leq T_i + 0$; and equation b) is rewritten as $T_i \leq T_0 + P/2$.

The graph is evaluated using different trial clock periods, and the smallest clock period for which there is no negative cycle is the clock period determined to be suitable for the circuit. A negative cycle exists if the sum of edge values is negative for any path that begins and ends with the same node. Further explanation is provided in the example shown in FIGS. 5A-5D, which is described in conjunction with the flow charts of FIGS. 3 and 4.

Figure 3:
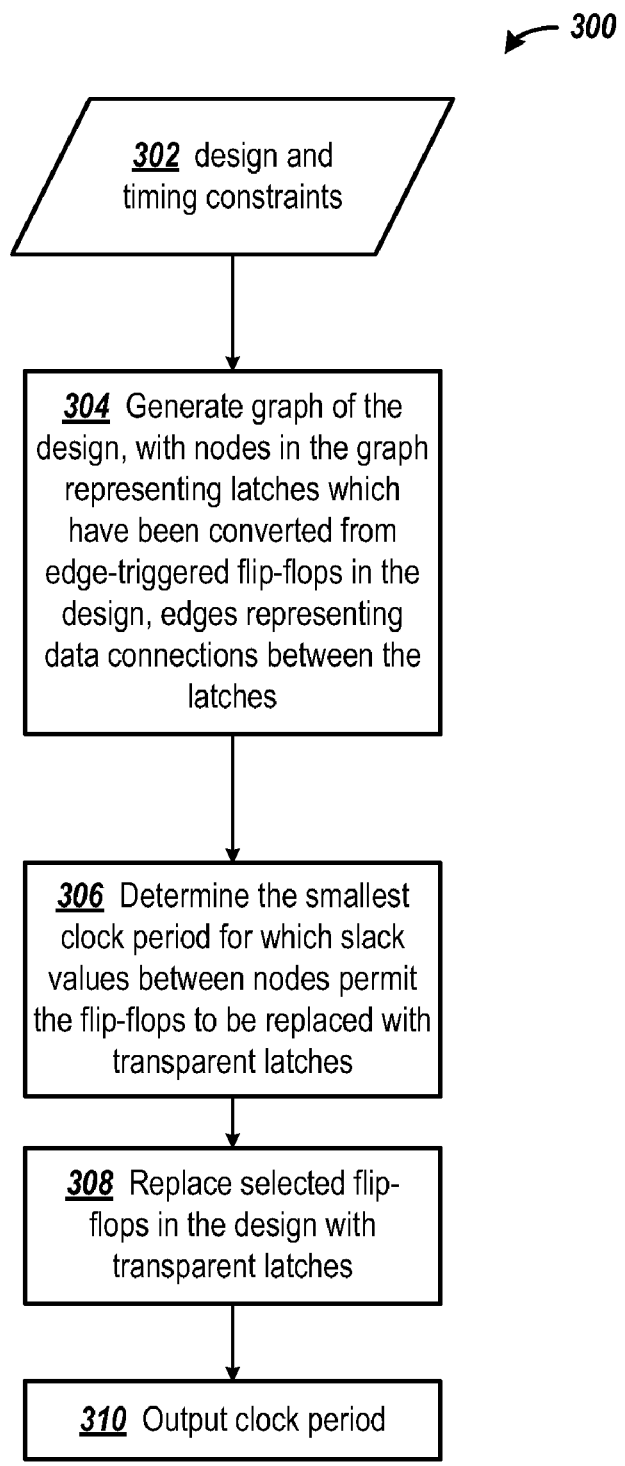
FIG. 3 is a flowchart of an example process for processing a circuit design in accordance with an example embodiment of the invention.

FIG. 3 is a flowchart of an example process 300 for processing a circuit design in accordance with an example embodiment of the invention. The input 302 to the process is a circuit design along with timing constraints for those paths designated by the designer as critical.

The process generates a graph from the design data at step 304. The design data may be that of a placed-and-routed design, a placed design, or that resulting from logic synthesis of a design. The generated graph is as described above with reference to FIG. 2, for example. Using the graph, at step 306 the process determines the smallest clock period for which the slack values on the edges permit the FFs to be replaced with latches. An example process for determining the smallest clock period is shown in FIG. 4 and described in connection with that figure.

Once a suitable clock period has been determined, selected edge-triggered FFs in the design can be replaced with transparent latches, as shown by step 308, and the modified design may be stored for subsequent use or processing. The manner in which the FFs are replaced depends on the target implementation. For example, in an FPGA implementation, selected bits in the configuration bitstream may be changed for each selected FF to configure the FF to operate as a transparent FF. Alternatively, the design having been mapped to FPGA resources may be modified to specify that the selected FFs are to be configured to operate as a transparent latch. For an ASIC, the design having been mapped to particular circuit elements may be modified to specify transparent latches instead of edge-triggered FFs for the selected FFs. The modified design is then output for subsequent processing. At step 310, the clock period determined at step 306 is output. In accordance with various embodiments of the invention, outputting the design and clock period is understood to encompass the outputting of data from a processor, which may include storing and/or display of that data.

Figure 4:
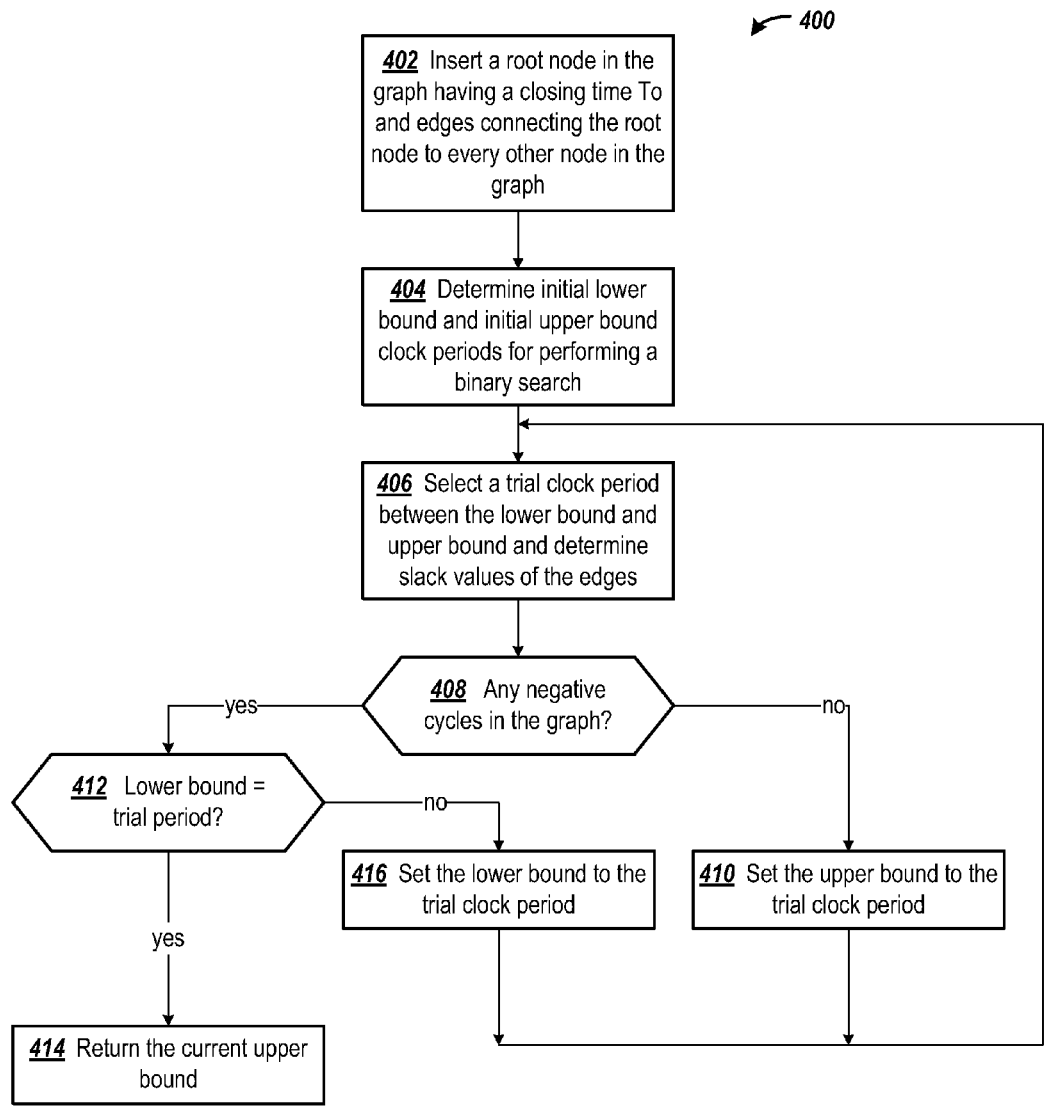
FIG. 4 is a flowchart of an example process for determining the smallest allowable clock period.

FIG. 4 is a flowchart of an example process 400 for determining the smallest allowable clock period, e.g., performing step 306 in FIG. 3. The process generally performs a binary search for the smallest clock period using the graph generated from the placed-and-routed circuit design. At step 402, a root node is added to the graph, with an assumed closing time of $T_0$. Edges are added from the root node to every other node in the graph and from every other node in the graph back to the root node. The slack values are all 0 for all the edges from the root node to the other nodes in the graph. The slack values for all the edges from the other nodes back to the root node are determined as half the trial clock period (P/2).

At step 404, an initial lower bound and an initial upper bound are selected for the clock period. For example, if timing constraints are not met for a critical path in the design, the corresponding clock period may be chosen as the lower bound. If the critical paths in the design do satisfy the timing constraints, then the initial lower bound may be some fraction of the clock period that satisfied the timing constraints, for example, half the satisfactory clock period. The initial upper bound may be the clock period for a design in a scenario in which the timing constraints are satisfied. If the timing constraints are not satisfied, then the initial upper bound may be some multiple (e.g., 2×) of the unsatisfactory clock period.

At step 406, the process selects a clock period between the initial lower and upper bounds. For example, the selected clock period may be calculated as: (lower bound+upper bound)/2, which may be rounded up or down as desired. Slack values for the edges in the graph are determined using the selected trial clock period. FIGS. 5A-5D show graphs that illustrate the application of the process of FIG. 4 to the example FF path of FIG. 2 with the following example propagation delays: $d_{1-2}=2$, $d_{2-3}=4$, $d_{2-4}=5$, $d_{3-1}=3$, and $d_{4-1}=4$. The example of FIGS. 5A-5D assumes an initial lower bound of 1 and an initial upper bound of 10.

Figure 5A:
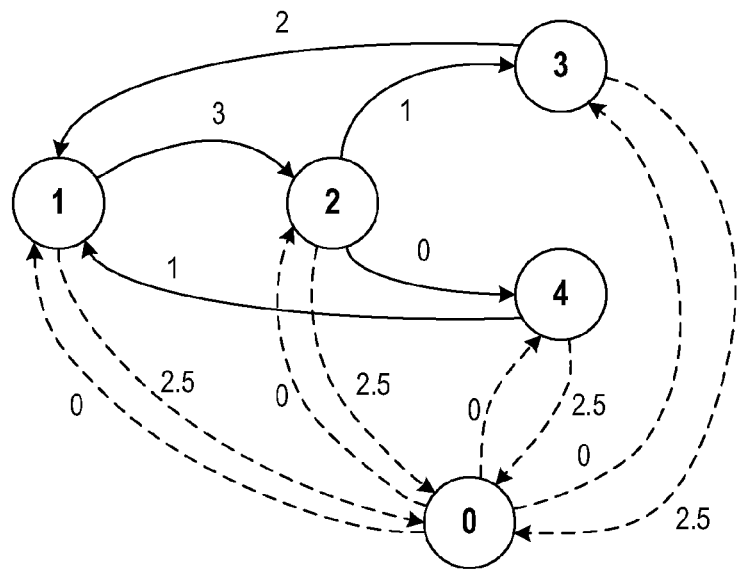
FIG. 5A shows an example graph, which corresponds to the graph of FIG. 3, with a selected trial period of 5.

FIG. 5A shows an example graph, which corresponds to the graph of FIG. 3, with a selected trial period of 5. The edge from node 1 to node 2 has a slack value of $P-d_{1-2}=5-2=3$. Similar calculations are performed for the slack values on the other edges. All edges directed to the root node from other nodes have slack values of P/2=2.5.

Step 408 determines whether there are any negative cycles in the graph. A negative cycle exists if the sum edge values is negative for any path that begins and ends with the same node. From the graph it may be observed that no negative cycle exists. Since there are no negative cycles, decision step 408 directs the process to step 410, which sets the upper bound to the trial clock period (5 in the example). The process returns to step 406 to select a new trial clock period. The new trial period may be determined as follows: (lower bound+upper bound)/2=(1+5)/2=3

Figure 5B:
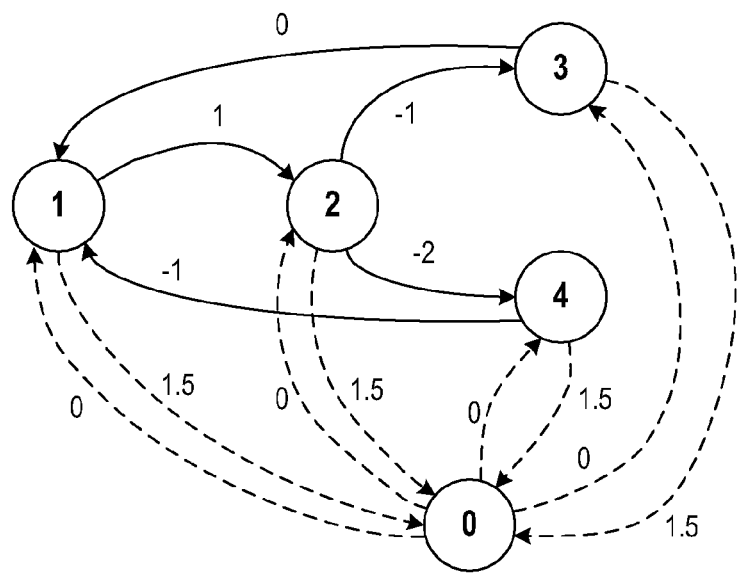
FIG. 5B shows a first example constraint graph, which corresponds to the graph of FIG. 3, with a trial period of 3.

FIG. 5B shows an example constraint graph, which corresponds to the graph of FIG. 3, with a trial period of 3. The slack values on the edges are computed using the new trial period of 3. For example, the edge from node 1 to node 2 has a slack value of $P-d_{1-2}=3-2=1$. Similar calculations are performed for the slack values on the other edges. All edges directed to the root node from other nodes have slack values of P/2=1.5.

There is a negative cycle in the graph from node 1 to node 2 to node 4 and back to node 1 (sum of the edge values=−2). Thus, a new lower bound is set to the trial period, 3, at step 416. The process returns to step 406 where the new trial period is set to (3+5)/2=4.

Figure 5C:
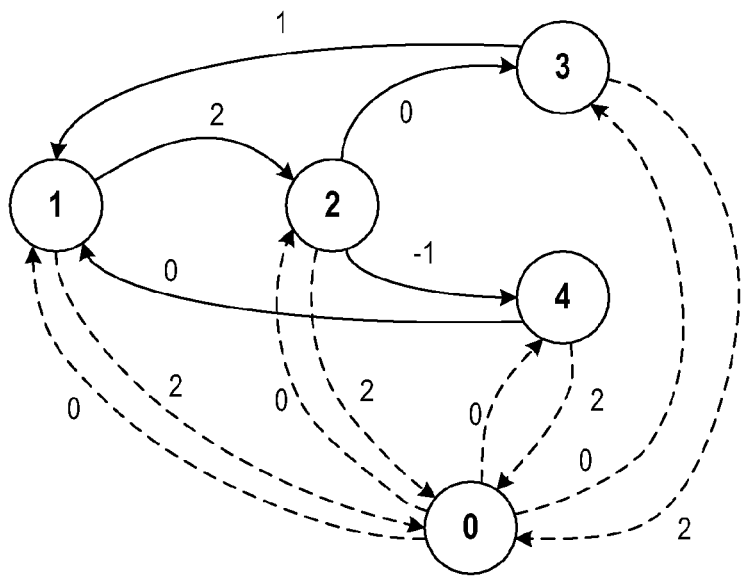
FIG. 5C shows an example constraint graph, which corresponds to the graph of FIG. 3, with a trial period of 4.

FIG. 5C shows an example constraint graph, which corresponds to the graph of FIG. 3, with a trial period of 4. The slack values on the edges are computed using the new trial period of 4. The edge from node 1 to node 2 has a slack value of $P-d_{1-2}=4-2=2$. Similar calculations are performed for the slack values on the other edges. All edges directed to the root node from other nodes have slack values of P/2=1.

There are no negative cycles in the graph, so a new upper bound is set to the trial period, 4, at step 410. The process returns to step 406 where the new trial period is set to (3+4)/2=3. Note that the fractional remainder is disregarded.

Figure 5D:
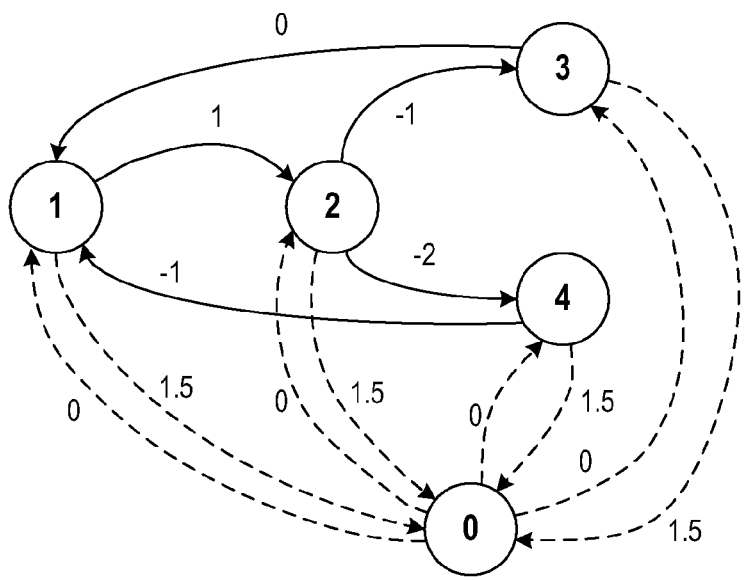
FIG. 5D shows a second example constraint graph, which corresponds to the graph of FIG. 3, with a trial period of 3.

FIG. 5D shows an example constraint graph, which corresponds to the graph of FIG. 3, with a trial period of 3, which was tested in a previous iteration. (The graph of FIG. 5D is similar to that shown in FIG. 5B, but is repeated here, for clarity.) The slack values on the edges are the same as those shown in FIG. 5B, and there is a negative cycle from node 1 to node 2 to node 4 and back to node 1 (sum of the edge values=−2). Thus, decision step 408 in FIG. 4 directs the process 400 to decision step 412.

At decision step 412, if the lower bound is equal to the trial period, then the upper bound is the solution, and step 414 returns the upper bound as the smallest clock period. In the example, the lower bound value of 3 is equal to the trial period of 3. Thus, the solution is the upper bound clock period of 4.

When the lower bound is not equal to the trial period in step 412, the lower bound is set to the trial period at step 416, and the process returns to step 406 to select a new trial period. The process then continues in evaluating the new trial period as described above.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for analyzing circuit designs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for improving clock speed for a circuit design, comprising:

generating a graph having nodes and edges that represent the circuit design, the nodes representing flip-flops of the design, the edges representing couplings of data inputs and outputs of the flip-flops, and the edges having associated delay values representing respective durations of signal delays of the couplings;

determining a smallest period for which subtracting each delay value from the smallest period and associating the difference with the associated edge does not create a negative cycle in the graph;

selecting a path in the graph, the path including selected flip-flops and connecting edges;

modifying the circuit design by replacing the selected flip-flops with latches; and outputting the smallest period.

2. The method of claim 1, wherein the modifying the circuit design includes changing a configuration bitstream to configure the selected flip-flops to operate as transparent latches.

3. The method of claim 1, wherein the design from which the graph is generated is a placed-and-routed design.

4. The method of claim 1, wherein the design from which the graph is generated is a placed and un-routed design.

5. The method of claim 1, wherein the design from which the graph is generated is an un-placed and un-routed design.

6. The method of claim 1, wherein the selected path is a path having a total delay greater than a maximum allowed delay for the design.

7. The method of claim 1, wherein the determining the smallest period includes performing a binary search on a range of trial periods.

8. An article of manufacture, comprising:

a processor-readable storage medium configured with instructions for improving clock speed for a circuit design, the instructions when executed by one or more processors causing the one or more processors to perform the operations including, generating a graph having nodes and edges that represent the circuit design, the nodes representing flip-flops of the design, the edges representing couplings of data inputs and outputs of the flip-flops, and the edges having associated delay values representing respective durations of signal delays of the couplings;

determining a smallest period for which subtracting each delay value from the smallest period and associating the difference with the associated edge does not create a negative cycle in the graph;

selecting a path in the graph, the path including selected flip-flops and connecting edges;

modifying the circuit design by replacing the selected flip-flops with latches; and outputting the smallest period.

9. The article of manufacture of claim 8, wherein the modifying the circuit design includes changing a configuration bitstream to configure the selected flip-flops to operate as transparent latches.

10. The article of manufacture of claim 8, wherein the design from which the graph is generated is a placed-and-routed design.

11. The article of manufacture of claim 8, wherein the design from which the graph is generated is a placed and un-routed design.

12. The article of manufacture of claim 8, wherein the design from which the graph is generated is an un-placed and un-routed design.

13. The article of manufacture of claim 8, wherein the selected path is a path having a total delay greater than a maximum allowed delay for the design.

14. The article of manufacture of claim 8, wherein the determining the smallest period includes performing a binary search on a range of trial periods.

15. A system for improving clock speed for a circuit design, comprising:

a processor; and a memory coupled to the processor and configured with instructions that when executed by the processor cause the processor to perform the operations including, generating a graph having nodes and edges that represent the circuit design, the nodes representing flip-flops of the design, the edges representing couplings of data inputs and outputs of the flip-flops, and the edges having associated delay values representing respective durations of signal delays of the couplings;

determining a smallest period for which subtracting each delay value from the smallest period and associating the difference with the associated edge does not create a negative cycle in the graph;

selecting a path in the graph, the path including selected flip-flops and connecting edges;

modifying the circuit design by replacing the selected flip-flops with latches; and outputting the smallest period.

16. The system of claim 15, wherein the modifying the circuit design includes changing a configuration bitstream to configure the selected flip-flops to operate as transparent latches.

17. The system of claim 15, wherein the design from which the graph is generated is a placed-and-routed design.

18. The system of claim 15, wherein the design from which the graph is generated is a placed and un-routed design.

19. The system of claim 15, wherein the design from which the graph is generated is an un-placed and un-routed design.

20. The system of claim 15, wherein the selected path is a path having a total delay greater than a maximum allowed delay for the design.

* * * * *